Dec. 10, 1935.  T. H. ARRISON  2,023,719
INSTRUMENT PANEL FOR AUTOMOBILES
Filed Sept. 5, 1934  2 Sheets-Sheet 1
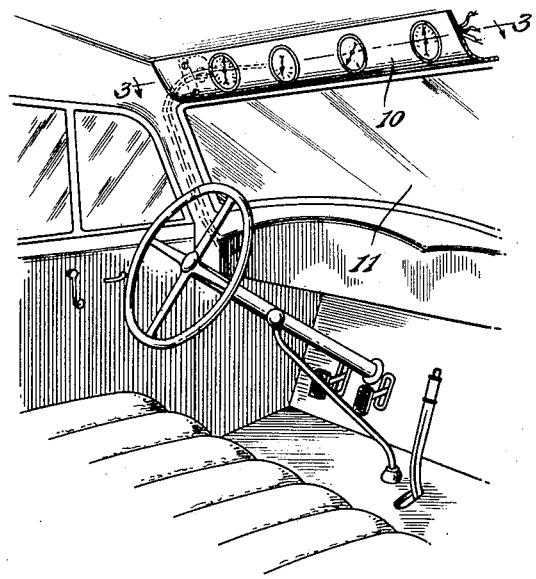
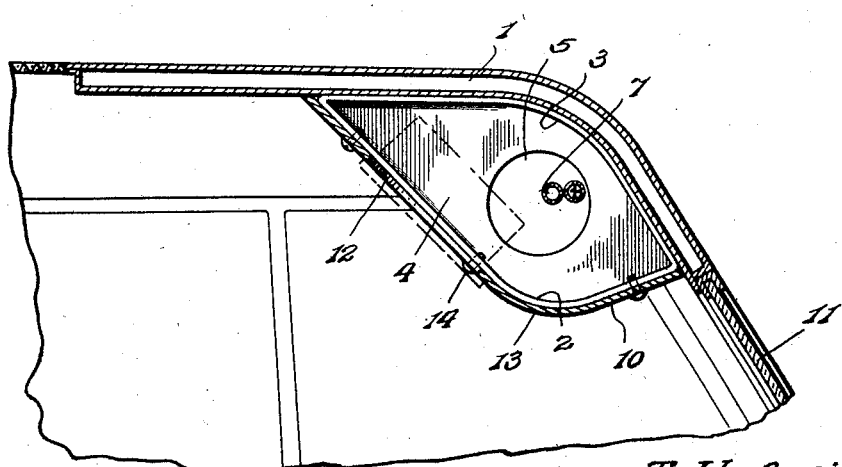
Inventor
T. H. Arrison.
By Lacey & Lacey,
Attorneys Dec. 10, 1935. T. H. ARRISON 2,023,719
INSTRUMENT PANEL FOR AUTOMOBILES
Filed Sept. 5, 1934 2 Sheets—Sheet 2
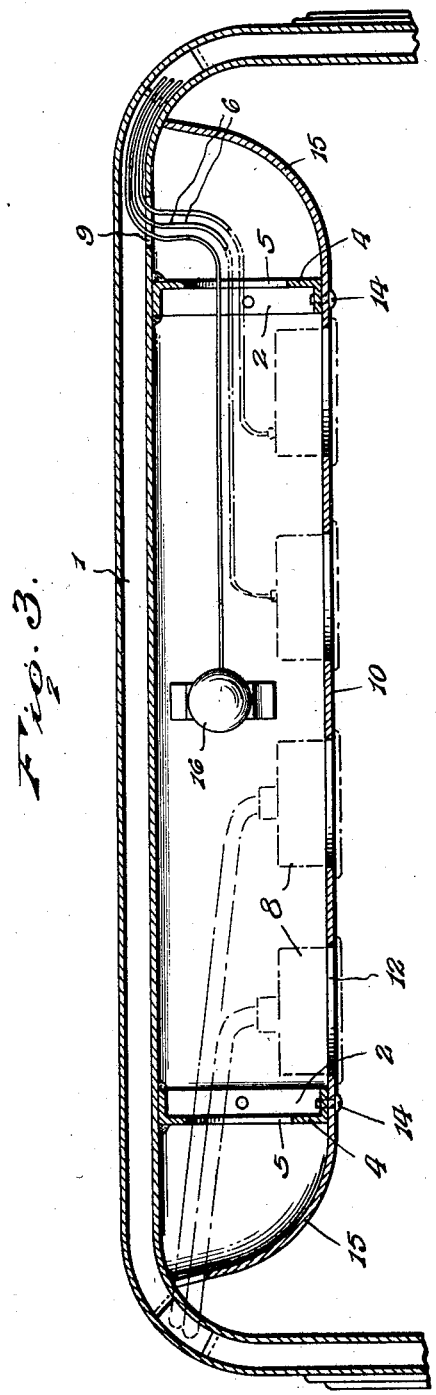
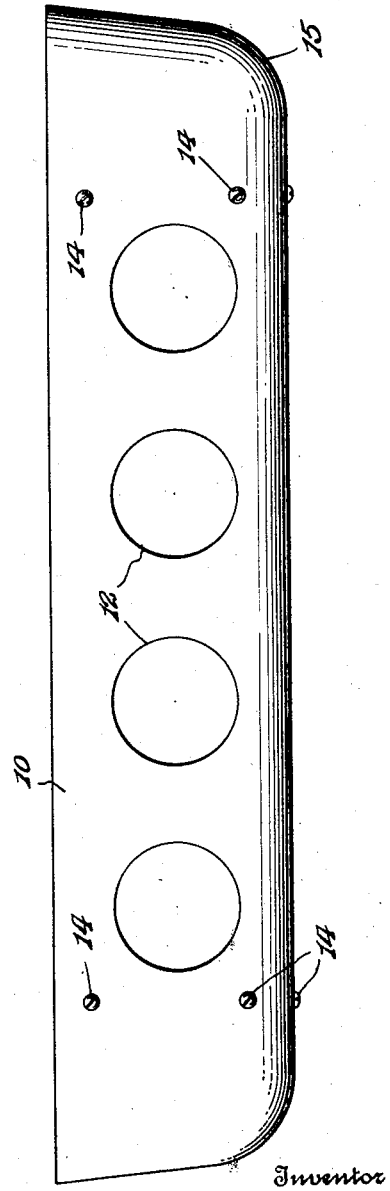
Inventor
T. H. Arrison.
By Lacey & Lacey, Attorneys Patented Dec. 10, 1935

2,023,719

UNITED STATES PATENT OFFICE 2,023,719

INSTRUMENT PANEL FOR AUTOMOBILES

Thomas Henry Arrison, Big Sandy, Mont.

Application September 5, 1934, Serial No. 742,853

1 Claim. (Cl. 296—1)

This invention relates to the instrument panels of motor vehicles and has for its object the provision of a panel so located that the instruments thereon may be easily read without requiring the chauffeur to shift his eyes so as to lose sight of the road ahead. As now ordinarily constructed and arranged the instrument boards of automobiles are located below the windshield and in many instances at one side of the steering wheel so that if the chauffeur desires to read any of the instruments he must turn his eyes to one side and thereby lose the straight ahead view of the road and also lower his eyes so that his vision of the road will be obstructed. The present invention provides a panel which is especially adapted to be secured at a point above the windshield in the angle defined by the top of the vehicle and the windshield frame where it will be easily viewed by the chauffeur with a mere upward glance of the eye. The invention is illustrated in the accompanying drawings and consists in certain novel features which will be hereinafter first fully described and then more particularly defined in the claim.

In the drawings:

Figure 1 is a perspective view of a portion of an automobile showing my improved panel in position therein.

Figure 2 is a longitudinal sectional view through the top of the automobile and the panel.

Figure 3 is a horizontal section taken through the panel and the adjacent portion of the body of the vehicle.

Figure 4 is an enlarged front elevation of the panel.

The body of the vehicle is indicated at 1 and it will be noted that the present generally accepted construction of automobile tops is a hollow or cellular frame in which the upper portion of the windshield frame and the forward portion of the roof or top of the vehicle are formed integral. In carrying out the present invention, I provide a plurality of brackets 2 which are preferably formed of angle bars shaped to conform to the angle or bend defined by the roof of the vehicle and the upper portion of the windshield frame and having a member depending downwardly and forwardly from their upper rear corners and merging into a member extending forwardly and united with the forward lower portions of the braces. The top and front sides, shown at 3, are welded or otherwise united with the steel windshield frame and the top of the vehicle, as shown in Figure 2, and the lower and rear arms or branches of the braces are provided with threaded openings to receive cap screws. The branches are formed with side plates 4 whereby they will be reinforced and be enabled to effectually resist deformation. In each side web is formed an opening 5 through which cables, indicated at 6, and tubes, indicated at 7, are passed to supply electrical energy or other motivating agencies to the several instruments on the panel, the instruments being indicated by dotted lines at 8 in Figure 3. These cables and wires are carried through openings 9 in the inner walls of the frame and then carried down through the hollow bodies and framework to proper points of connection. The panel 10 is preferably formed of sheet metal stamped from a single integral blank and extends across the interior of the vehicle just above the windshield 11, as clearly shown in Figures 1 and 2. Openings 12 are formed through the front portion of the panel and the various instruments are mounted in these openings in any approved manner, the number of openings being determined by the number of instruments which are to be applied. The panel in cross section has the general form of an obtuse angle, the point of the angle being rounded, as clearly shown at 13 in Figure 2, and the panel fits closely against the rear and lower faces of the web braces and is removably secured thereto by cap screws 14 inserted through the panel at intervals to engage in the threaded openings provided in the braces and previously mentioned. The panel is thus removably held upon the brackets or frames and may be easily removed whenever inspection or repair of the instruments is desired, the instruments being moved from the windshield frame with the panel. The panel may be of any size determined by the form and dimensions of the vehicle to which it is to be applied and, as shown in Figure 3, its end portions 15 are curved to meet the inner face of the vehicle frame and impart a graceful appearance to the panel as well as effectually hide the several cables and tubes. An electric lamp 16 is mounted within the chamber defined by the panel and may be carried upon the bottom portion of the panel or mounted upon the frame of the vehicle so that the panel may be illuminated when the vehicle is in use at night. The lamp will, of course, be controlled by a suitable switch arranged at some convenient point within the vehicle.

From the foregoing description, taken in connection with the accompanying drawings, it will be seen that I have provided a very simple panel whereby the several instruments will be effectually supported at a point above the windshield so that they may be read by the chauffeur without requiring the chauffeur to lose his view of the road ahead. Located above the windshield, the panel will be just above the line of vision when the chauffeur is looking straight ahead so that a momentary upward glance will be sufficient to note the reading of any instrument.

Having thus described the invention, what is claimed as new is:

In combination with a vehicle body including an angular frame member constituting a connection between the roof and front of the body, a plurality of braces secured in depending relation to the angular frame member in spaced relation to each other transversely of the vehicle body, each brace having a diagonally extending rear edge and a lower edge merging into the lower end of the rear edge, and a panel having rear and lower portions diverging from each other and removably secured to the rear and lower edge faces of said braces with edges of the panel abutting upper and forward portions of the frame member at rear and front ends of the braces, the said rear portion of the panel being formed with instrument receiving openings, and end portions of the panel being bent to form end walls abutting the upper and forward portions of the frame member adjacent the side walls of the vehicle body.

THOMAS HENRY ARRISON. [L. S.]